(12) United States Patent
Cramm

(10) Patent No.: US 8,785,573 B2
(45) Date of Patent: Jul. 22, 2014

(54) PROCESS FOR PREPARING WATER SOLUBLE POLYMERS WITH NO INSOLUBLE GELS AND LOW LEVELS OF RESIDUAL MONOMERS

(75) Inventor: Jeffrey R. Cramm, Batavia, IL (US)

(73) Assignee: Ecolab USA Inc, Naperville, IL (US)

(*) Notice: Subject to any disclaimer, the term of this patent is extended or adjusted under 35 U.S.C. 154(b) by 76 days.

(21) Appl. No.: 13/611,026

(22) Filed: Sep. 12, 2012

(65) Prior Publication Data

US 2014/0073749 A1    Mar. 13, 2014

(51) Int. Cl.
*C08F 2/01* (2006.01)
*C08F 120/56* (2006.01)
*B01J 19/18* (2006.01)

(52) U.S. Cl.
USPC ............ 526/65; 526/62; 526/303.1; 526/918; 422/134; 422/650

(58) Field of Classification Search
USPC ............ 526/65, 303.1, 918, 62; 422/134, 650
See application file for complete search history.

(56) References Cited

U.S. PATENT DOCUMENTS

| | | | |
|---|---|---|---|
| 2,883,148 A | 4/1959 | Williams | |
| 3,058,431 A | 10/1962 | Eddy | |
| 3,414,552 A | 12/1968 | Scanley | |
| 3,558,759 A * | 1/1971 | Sarem | 264/142 |
| 4,482,682 A | 11/1984 | Kudomi et al. | |
| 4,552,336 A | 11/1985 | Pastrone | |
| 4,798,365 A | 1/1989 | Mayhew | |
| 5,183,879 A | 2/1993 | Yuasa et al. | |
| 5,246,204 A | 9/1993 | Ottung | |
| 2005/0186126 A1 | 8/2005 | Burns | |
| 2008/0085974 A1 | 4/2008 | Sortwell | |
| 2011/0124828 A1 | 5/2011 | Fouarge | |

FOREIGN PATENT DOCUMENTS

| | | |
|---|---|---|
| CN | 1057057 A | 12/1991 |
| DE | 2729754 A1 | 1/1978 |
| EP | 0066332 A2 | 12/1982 |
| EP | 0036819 B1 | 3/1985 |
| EP | 0677537 B1 | 1/1999 |
| FR | 2700771 A1 | 7/1994 |
| GB | 1242551 A | 8/1971 |
| GB | 2139632 A | 11/1984 |
| IN | 169363 A1 | 10/1991 |

OTHER PUBLICATIONS

Alkaline Hydrolysis of Polyacrylamide: Russian Journal of Applied Chemistry, vol. 74, No. 4, 2001, pp. 543-554.

(Continued)

*Primary Examiner* — Fred M Teskin
(74) *Attorney, Agent, or Firm* — Benjamin E. Carlsen

(57) ABSTRACT

The invention provides a method and apparatus for continuously feeding wet gel polymers into a drying step of a dry polymer synthesis operation. A number of pistons are arranged having inner chambers through which monomers and other reagents are fed and polymerized into wet gel polymers. Each piston operates according to a coordinated schedule so that as one piston finishes extruding polymer into the drying step, a second piston has completed polymerizing more polymer and continues to feed more polymer without interruption. The then finished is re-fed more reagents so as to be ready again when needed next. As a result, cost effective continuous feeding can be achieved without the contamination and impurity problems that have plagued previous attempts to accomplish this.

20 Claims, 3 Drawing Sheets

(56) References Cited

OTHER PUBLICATIONS

Preparation of polyacrylamide with an ultra-high molecular weight by homopolymerization cohydrolysis of acrylamide: Daqing Shiyou Xueyuan Xuebao (2000), 24(1), 37-39.

Alkaline polymerization of acrylamide: Buletinul Institutului Politehnic din Iasi, Sectia 2: Chimie si Inginerie Chimica (1995), 41(1-4), 115-120.

Polymerization of acrylamide in concentrated aqueous solutions in the presence of alkaline hydrolyzing agents: Plast. Massy (1991), Issue 8, 9-11.

Adiabatic polymerization of acrylamide in aqueous solutions in the presence of hydrolyzing agent: Eur. Polym. J. (1990), 26(8), 915-18.

\* cited by examiner

PROCESS FOR PREPARING WATER SOLUBLE POLYMERS WITH NO INSOLUBLE GELS AND LOW LEVELS OF RESIDUAL MONOMERS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to novel methods and apparatuses for preparing water soluble dry polymers. Water soluble dry polymers are polymers that are typically hygroscopic and are stored in dry conditions. One key advantage of dry polymers is their weight, which makes them inexpensive to store and transport. Dry polymers are commonly prepared from sticky rubber like materials known as "wet gels". Wet gels are extremely viscous polymers formed from the polymerization of vinyl monomers in water. Currently, converting wet gels into dry polymers is a lengthy and energy intensive process. This process involves a drying step in which the wet gels are cut into small enough pieces that allow for the rapid removal of water by evaporation without overheating. The dried polymer is then ground into a size that is best suited for a re-dissolving in water at a desired speed.

Continuous operation of the cutting, drying, and grinding processes is the most cost effective manner of producing dry polymer. In a continuous operation, a steady supply of wet gel polymer is continuously fed into the drying step and a steady supply of dry polymer is continuously output. Current continuous dry steps make use of continuous polymerization reactions that are belt fed into the drying step. Maintaining quality control in these operations however is difficult because the short residence time of the monomers in a continuous polymerization reactor makes it difficult to maintain both a high molecular weight and 100% solubility of the resulting dry polymer. In addition too much un-reacted residual monomer often remains further contaminating the product. As a result, industry also makes use of less efficient batch processing and feeding of wet gels to preserve reliable dry polymer quality. Thus there remains a need for an improved method of continuously producing dry polymers that does not sacrifice high quality polymer properties.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment is directed towards a method of feeding wet gel polymer into a drying step of a water soluble dry polymer synthesis operation. The method comprises the steps of: a) receiving polymerization reagents into a flow loop the flow loop constructed and arranged to regulate the flow of the reagents such that they are sequentially passed into one of a plurality of pistons, b) polymerizing those polymerization reagents into wet gel polymers within one of the plurality of pistons, and c) feeding the wet gel polymers from the pistons into the drying step. Each piston is constructed and arranged to: receive polymerization reagents, contain a polymerization reaction, and feed wet polymer according to a coordinated sequence, timed to effect continuous feeding of wet gel into the drying step. The polymerization reagents include monomers and at least one other composition of matter.

The piston may comprise an inner chamber, a sealable entry valve constructed and arranged to receive two or more flows of polymerization reagents and to deposit substantially all of the received polymerization reagents into the inner chamber, a sealable exit valve in fluidic communication with the inner chamber which passes fluid on to a drying step, and a plunger capable of pressing the contents of the inner chamber out through the exit valve. The entry valve may be constructed and arranged to pass substantially all of its contents into the inner chamber when the entry valve is sealed and may be constructed and arranged to receive two fluid streams, which are mixed immediately before they are passed into the inner chamber.

The plunger may comprise a face which contacts fluids within the inner chamber, the face having a diameter that substantially fills a cross sectional area of the inner chamber and which is constructed and arranged to push substantially all fluid within the inner chamber out through the exit valve. The method may further comprise a stripper tank, and further comprise the step of mixing a solution of monomers and at least one other polymerization reagent within the stripper tank, keeping the temperature within the stripper tank too low for a polymerization reaction to occur, and feeding that mixture into the piston at a coordinated time. The stripper tank may have the same volume as the portion of the inner chamber in which polymerization will occur. The method may further comprise the step of purging oxygen from the stripper tank prior to feeding the polymerization reagents into the piston or inhibiting any polymerization from occurring until the piston of completely filled up. The inhibition may occur through one step selected from the list consisting of: adding an induction time increasing agent to the polymerization reagents, preventing the contact of a reaction dependent polymerization reagent with other polymerization reagents until all the polymerization reagents are fed into the piston, and any combination thereof.

The method may include an induction time increasing agent added to the polymerization reagents which increases the induction time to at least the time (or possibly 5 minutes more than is) needed to completely fill all the polymerization reagents into the inner chamber and seal the piston. The method may further comprise the step of providing a temperature jacket in contact with at least a portion of at least one piston, the temperature jacket constructed and arranged to regulate the temperature of at least a portion of that piston. The interior of the piston in which the polymerization reaction occurs may be substantially smooth and coated with a material that inhibits the adhesion of wet gel polymer to the piston.

The polymerization reaction may be a simultaneous polymerization of acrylamide and a hydrolysis of poly(acrylamide) and in which the polymerization reagents further comprise acrylamide monomer and potassium carbonate. The coordination between the pistons may be such that just as a first piston has completely fed its wet gel polymer into the drying step a second piston has just completed its polymerization reaction and begins to feed its wet gel polymers into the drying step. There may be 2-6 (and/or 4) pistons.

BRIEF DESCRIPTION OF THE DRAWINGS

A detailed description of the invention is hereafter described with specific reference being made to the drawings in which.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Initiator" means a composition of matter that initiates a free radical polymerization reaction upon thermal decomposition or reaction with a second component of a redox pair.

"Batch Process" means a chemical process in which only a finite number of reagents can be fed into a reaction operation over a specific period of time and which produces a finite amount of product.

"Continuous Process" means an ongoing chemical process, which is capable of continuing over an unlimited period of time in which reagents can be continuously fed into a reaction operation to continuously produce product. Continuous Process and Batch Process are mutually exclusive.

"Dry Polymer Synthesis" means the conversion of wet water soluble monomers into dry polymers according to a process which includes but is not limited to at least one action performed on the resulting polymer from the list of: cutting, drying, cooling, grinding, sifting, packaging, and any combination thereof.

"Water Soluble Dry Polymer" means polymers that are hygroscopic and therefore are best stored in dry conditions.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

Figure 1:
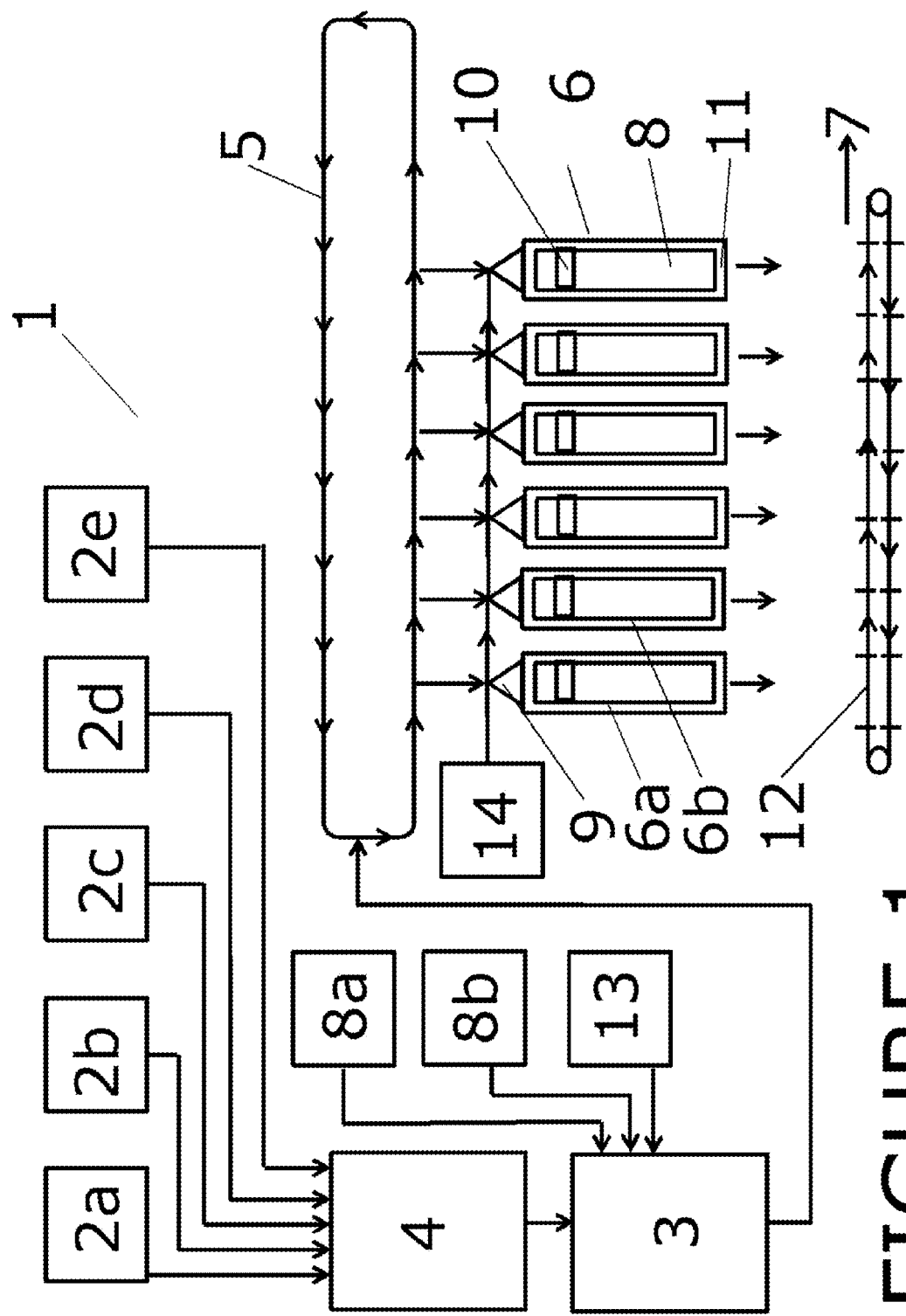
FIG. 1 is an illustration of the inventive polymerization process.

Referring now to FIG. 1 there is shown an apparatus and a method of producing anionic dry polymers. The apparatus (1) comprises one or more monomer storage vessels (2a-e) which are constructed and arranged to feed the monomer into a stripper tank (3). In at least one embodiment one or more of the monomers and/or one or more or of any other needed reagents (8a-b) (such as catalysts, initiators, and inhibitors) can be fed into the stripper tank (3) or into a make down tank (4) upstream from the stripper tank (3) within which one or more of the reagents may be changed from the format they were stored in into a format more suitable for the reaction. The reaction components are then fed into a flow loop (5) which appropriately feeds into two or more piston reactors (6). The polymerization reaction occurs within the piston reactors (6a-b) and is passed on to a drying stage (7) where the resulting wet polymer is dried.

In at least one embodiment, the initiation sequence and charging method is optimized for continuous feeding of wet gel polymers into a drying stage (7). First a monomer solution is prepared in a large make down tank (4) and is chilled to the desired initiation temperature. A stripper tank (3) is then provided which is of equal volume to the interior of the piston (6). The stripper tank (3) is filled with chilled monomer solution. The oxygen level in the stripper tank is then reduced to below 100 ppb by purging the tank with an inert gas (13) (such as nitrogen, helium, and or argon). A number of additives are then added to the stripper tank from one or more additive storage containers (8a-b) including but not limited to: a chelating agent which complexes and deactivates metallic inhibitors, a polymerization delay inhibitor, at least one thermally activated initiator, an oxidizing component of a redox-initiator system, and any combination thereof.

Figure 2:
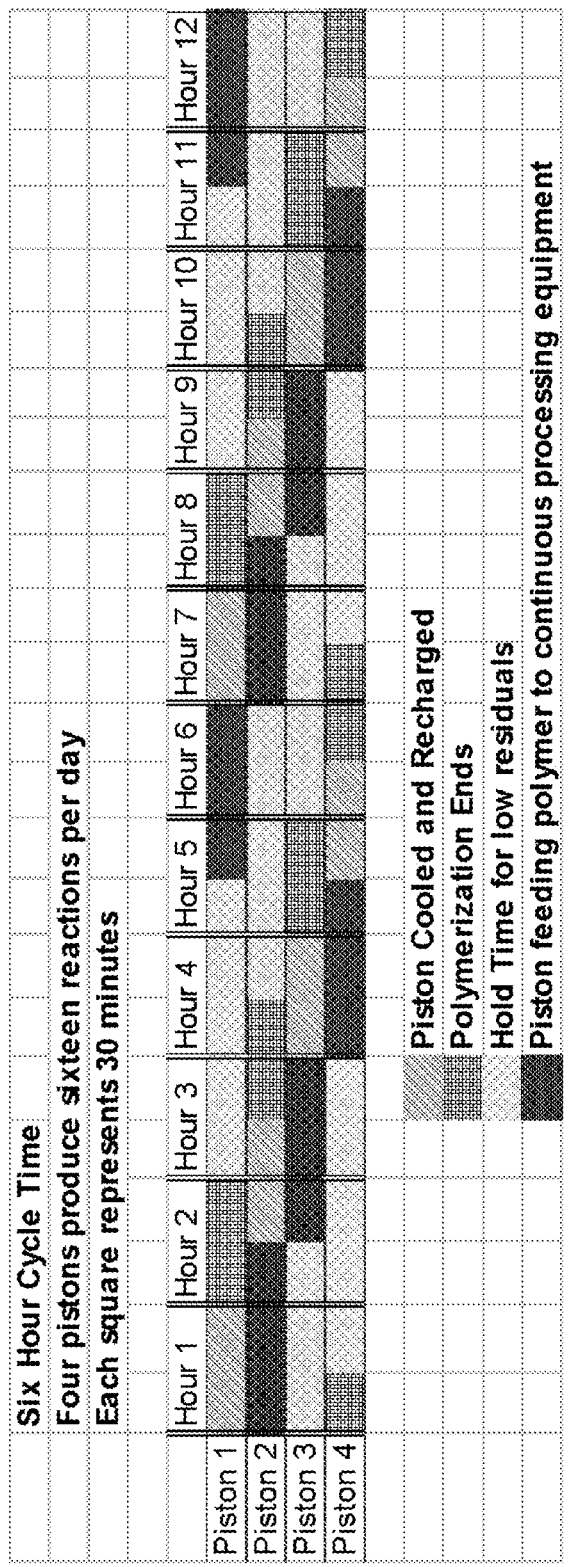
FIG. 2 illustrates a four piston reaction system sequence.
Figure 3:
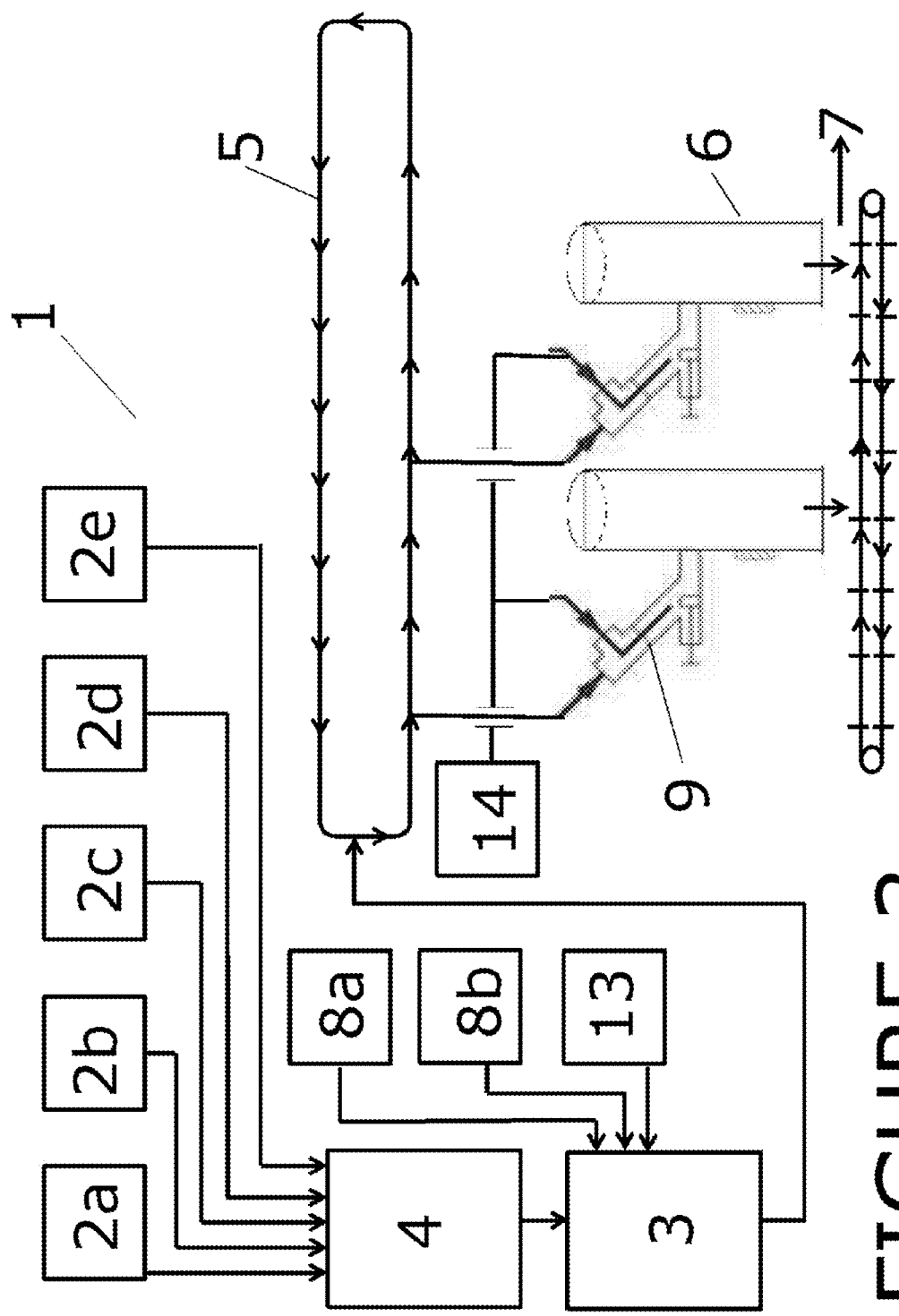
FIG. 3 illustrates an alternative four piston reaction system sequence.

The contents of the stripper tank (3) are continuously fed through a flow loop (5) that flows past each of the piston reactors (6) at a specific flow rate. At the appropriate time the flow is diverted to the next piston reactor in the sequence. While FIG. 1 illustrates that the piston reactors are next to each other, the positioning of the reactors can be according to any configuration. Similarly while the above example had the next piston reactor being the one immediately alongside the first piston reactor, the sequence between the reactors can be according to any order of the piston reactors. FIG. 2 illustrates a possible sequence of piston use for a four piston reaction system. In addition, additional reactants (14) may be added at other stages of the process and may have circulation loops of their own.

When the contents of the stripper tank (3) have completely filled the chamber (8) of the piston reactor (6), a special valve (9), which is constructed and arranged to completely push all of the contents of the valve (9) into the piston reactor chamber (8) is sealed and emptied. This prevents any polymerization of polymer within the valve (9). In at least one embodiment the valve is a Piston Type Regulator Valve. Representative Piston Type Regulator Valves include but are not limited to M4 valves manufactured by Keofitt a/s of Denmark, and sampling Valves such as SV-500 valves by those manufactured by Strahman Valves Inc. Bethlehem, Pa., and those described in U.S. Pat. Nos. 4,552,336, 5,246,204, and 3,058,431. In at least one embodiment, the Stripper tank itself is completely emptied eliminating any possibility of polymer build up in the tank or feed lines and is immediately ready to repeat the process and fill the next piston in the sequence. The bottom of the reactor is also specially sized to have the same diameter as the piston chamber. This way 100% of the wet gel polymer is pushed out of the piston chamber by the plunger.

In at least one embodiment, a supply of wet gel is continuously fed into a drying stage (7) for an unlimited amount of time. This continuous feeding is accomplished by the series of pistons (6) within each of which a polymerization reaction occurs. When polymerization has occurred for a sufficient period of time in any one piston, the gel polymer is pressed out of the piston by a plunger (10) through an exit valve (11) and into the drying stage (7). The reagents for polymerization are fed into each piston according to a coordinated chronological sequence so that as soon as any one piston has completed feeding its contents, another piston begins feeding its contents, and the empty piston appropriately is re-charged. This allows the pistons to effect a continuous feed of wet gel into a drying stage. Because both the receipt of polymerization reagents by the piston and the passing on of wet gel to the drying step are coordinated, this procedure can be fit within an overall continuous process for synthesizing dry polymer. In at least one embodiment, at least one of the pistons is one similar to or the same as used in an F-40 Reactor produced by River City Enterprises.

Each piston (6) comprises an entry valve (9), a plunger (10), and an exit valve (11). In at least one embodiment, the exit valve (11) is a knife gate valve. In at least one embodiment the knife gate valve is at least one of those described in U.S. Pat. Nos. 2,883,148 and/or 4,798,365. In at least one embodiment the knife gate valve is a Diamond-Port as produced True Line. The insides of the pistons are ideal reactors for wet gel polymerization. Because wet gel polymers are extremely viscous, no internal components are present within the pistons. In at least one embodiment, the polymerizations are run adiabatically and substantially no heat is allowed to escape from the interior of the piston.

The wet gel polymer can be discharged through a large diameter knife gate valve that forms a liquid and gas tight seal when closed. The discharge rate is controlled by applying pressure to the plunger on the opposite side of a piston that slides along the smooth walls of the reactor. The plunger displaces up to all of the entire volume of the piston chamber and empties it completely. The bottom valve design has an opening equal to the inside diameter of the piston interior. This allows complete discharge of the wet gel from the piston chamber before the next batch of monomer is added. As a result, the piston chamber can be refilled again and again without needing any cleaning. This avoids problems associated with contamination of newly formed wet gels with left-over products and residuals of earlier polymerizations.

One problem currently present in polymerization reactions is contamination clue to non-homogenous temperature of the reagents. If cold monomer is pumped into hot, partially polymerized monomer, the interaction results in poor quality polymer. Some examples of this poor quality is polymers having one or more of: incomplete water solubility, lower molecular weight, higher residual monomer, and any combination thereof. One way to address this is to assure that no polymerization begins until the piston chamber is completely filled and sealed assuring a constant uniform temperature. This invention includes two strategies to assure this occurs, the first is to place all of the reagents but one reaction dependent reagent in the stripper and flow loop and to only add the last one immediately before entering the chamber. The second is to use an inhibitor to delay the onset of polymerization until after the chamber has been completely filled and sealed. In at least one embodiment the time short time interval is a time within the range of 5 and 10 minutes.

In at least one embodiment, the reaction dependent reagent that is not added until all of the other reagents have been added is a reducing component of a redox initiator. Instead, the reducing component of a redox initiator is pumped through a second loop that also flows past each piston at a specific flow rate. At the appropriate time, the flow containing the monomer and other reagents and the flow containing the reducing component of a redox initiator are simultaneously directed to a given piston. Both flows pass through the special valve where they are mixed on the way through the reactor wall.

In at least one embodiment, a delay inhibitor is used to delay the onset of polymerization for a pre-determined length of time after the addition of reducing components of the redox initiator system. For optimal polymerization conditions, the piston chamber is completely filled before polymerization begins. In at least one embodiment, the delay inhibitor causes an induction time of 10-15 minutes while the feed mechanism feeds and seals the piston in 5-10 minutes.

In at least one embodiment, the piston is constructed and arranged to tolerate reaction temperatures of over 100° C. and to contain gaseous by products. In at least one embodiment, the piston further comprises a temperature jacket which appropriately cools or heats the piston chamber walls. In at least one embodiment the walls contain a chamber filled with cool or hot fluid which causes this cooling or heating effect. This jacket can be used, both to regulate surface temperature during polymerization or to cool the piston chamber rapidly to accept new reagents rapidly after synthesizing and passing on hot wet gel polymers. In at least one embodiment the walls of the piston chamber are at least partially coated with a composition of matter that reduces adhesion of wet gel polymers.

In at least one embodiment a conveyer belt (12) is constructed and arranged to slide downstream from one or more of the pistons, receive the extruded polymer, and thereby continuously pass the polymers on to the drying stage (7).

In at least one embodiment the wet gel polymer produced in the piston chamber include but are not limited to high molecular weight flocculants, anionic, cationic, and nonionic polymers. In at least one embodiment, the reaction occurring within the piston chamber (or a standard reactor) is a simultaneous acrylamide polymerization and hydrolysis of poly (acrylamide). In the prior art, it is common to polymerize poly(acrylamide) and then subsequently hydrolyze the polymer. This is because common hydrolyzing agents are either too strong (like NaOH) and react with the monomers to form contaminants or they cause crystallization of acrylamide at low temperature (like $Na_2CO_3$).

In at least one embodiment, potassium carbonate is added to the acrylamide monomer which results in the hydrolysis of poly(acrylamide) as it is formed. Acrylamide is more soluble in the presence of potassium carbonate than sodium carbonate which allows for increasing the concentration of monomers within the piston chamber or reactor which increases the hydrolysis. However because the potassium carbonate is not as reactive as NaOH, it does not cause unwanted side reactions with monomers. In at least one embodiment, a solution which is 15 mole-% potassium carbonate yields 40 mole-% hydrolysis of poly(acrylamide). This one step reaction avoids the costs of a second synthesis step and avoids the need to use acrylic acid in the synthesis of anionic wet gels.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of feeding wet gel polymer into a drying step of a water soluble dry polymer synthesis operation comprising the steps of:
receiving polymerization reagents into a flow loop the flow loop constructed and arranged to regulate the flow of the reagents such that they are sequentially passed into one of a plurality of pistons,
polymerizing those polymerization reagents into wet gel polymers within one of the plurality of pistons, and
feeding the wet gel polymers from the pistons into the drying step,
each piston is constructed and arranged to:
receive polymerization reagents, contain a polymerization reaction, and feed wet polymer according to a coordinated sequence, timed to effect continuous feeding of wet gel into the drying step,
the polymerization reagents including monomers and at least one other composition of matter.

2. The method of claim 1, in which the piston comprises:
an inner chamber,
a sealable entry valve constructed and arranged to receive two or more flows of polymerization reagents and to deposit substantially all of the received polymerization reagents into the inner chamber,
a sealable exit valve in fluidic communication with the inner chamber which passes fluid on to a drying step, and
a plunger capable of pressing the contents of the inner chamber out through the exit valve.

3. The method of claim 2 in which the entry valve is constructed and arranged to pass substantially all of its contents into the inner chamber when the entry valve is sealed.

4. The method of claim 2 in which the entry valve is constructed and arranged to receive two fluid streams, which are mixed immediately before they are passed into the inner chamber.

5. The method of claim 2 in which the plunger comprises a face which contacts fluids within the inner chamber, the face having a diameter that substantially fills a cross sectional area of the inner chamber and which is constructed and arranged to push substantially all fluid within the inner chamber out through the exit valve.

6. The method of claim 1 in further comprising a stripper tank, and further comprising the step of mixing a solution of monomers and at least one other polymerization reagent within the stripper tank, keeping the temperature within the stripper tank too low for a polymerization reaction to occur, and feeding that mixture into the piston at a coordinated time.

7. The method of claim 6, in which the stripper tank has the same volume as the portion of the inner chamber in which polymerization will occur.

8. The method of claim 6 further comprising the steps of:
a) providing at least one make down tank in which monomers and at least one other polymerization reagent is mixed, and
b) dispensing at least a portion of the mixture of monomers and at least one other polymerization reagent into the stripper tank in a coordinated manner to facilitate continuous feeding of the piston.

9. The method of claim 6, further comprising the step of purging oxygen from the stripper tank prior to feeding the polymerization reagents into the piston.

10. The method of claim 1 further comprising the step of inhibiting any polymerization from occurring until the one of the plurality of pistons is completely filled up.

11. The method of claim 10 in which the inhibition occurs through one step selected from the group consisting of: adding an induction time increasing agent to the polymerization reagents, preventing the contact of a reaction dependent polymerization reagent with other polymerization reagents until all the polymerization reagents are fed into the one of the plurality of pistons, and any combination thereof.

12. The method of claim 2, in which an induction time increasing agent is added to the polymerization reagents which increases the induction time to at least 5 minutes more than is needed to completely fill all the polymerization reagents into the inner chamber and seal the piston.

13. The method of claim 1 in further comprising the step of providing a temperature jacket in contact with at least a portion of at least one piston, the temperature jacket constructed and arranged to regulate the temperature of at least a portion of that piston.

14. The method of claim 13 further comprising the step of maintaining the temperature within the piston at a level too low for the polymerization to begin until all of the polymerization reagents have been received and the piston has been sealed.

15. The method of claim 1 in which the piston is constructed and arranged to tolerate an adiabatic polymerization reaction in excess of 100° C.

16. The method of claim 1 in which the interior of the piston in which the polymerization reaction occurs is substantially smooth and is coated with a material that inhibits the adhesion of wet gel polymer to the piston.

17. The method of claim 1 in which the polymerization reagents further comprises one item selected from the group consisting of: a chelating agent, a polymerization delay inhibitor, a thermally activated initiator, an oxidizing component of a redox initiator system, a reducing agent of a redox initiator system, and any combination thereof.

18. The method of claim 1 in which the polymerization reaction is a simultaneous polymerization of acrylamide and a hydrolysis of poly(acrylamide) and in which the polymerization reagents further comprise acrylamide monomer and potassium carbonate.

19. The method of claim 1 in which the coordination between the pistons is such that just as a first piston has completely fed its wet gel polymer into the drying step a second piston has just completed its polymerization reaction and begins to feed its wet gel polymers into the drying step.

20. The method of claim 19 in which the coordination is between four pistons.

* * * * *